(12) United States Patent
Bavand et al.

(10) Patent No.: US 10,123,195 B1
(45) Date of Patent: *Nov. 6, 2018

(54) METHOD AND SYSTEM OF CROWD-SOURCED PEDESTRIAN LOCALIZATION

(71) Applicant: MAPSTED CORP., Mississauga OT (CA)

(72) Inventors: Majid Bavand, Toronto (CA); Sean Huberman, Guelph (CA); Paramvir Singh Nagpal, Markham (CA); Eros Gulo, Vaughan (CA)

(73) Assignee: MAPSTED CORP., Mississauga, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/928,167

(22) Filed: Mar. 22, 2018

(51) Int. Cl.
*H04W 4/80* (2018.01)
*G01C 21/20* (2006.01)
*H04W 4/024* (2018.01)

(52) U.S. Cl.
CPC ............ *H04W 4/80* (2018.02); *G01C 21/206* (2013.01); *H04W 4/024* (2018.02)

(58) Field of Classification Search
CPC ......... H04W 4/024; H04W 4/80; G01C 21/20
USPC ...................................... 455/456.1
See application file for complete search history.

(56) References Cited

U.S. PATENT DOCUMENTS

| | | | | |
|---|---|---|---|---|
| 5,646,593 | A * | 7/1997 | Hughes | G08B 21/0222 340/539.1 |
| 2005/0234363 | A1* | 10/2005 | Xue | A61B 5/0452 600/515 |
| 2006/0075131 | A1 | 4/2006 | Douglas et al. | |
| 2009/0043504 | A1 | 2/2009 | Bandyopadhyay et al. | |
| 2013/0033999 | A1 | 2/2013 | Siomina et al. | |
| 2016/0295376 | A1* | 10/2016 | Geng | H04W 4/80 |
| 2016/0366468 | A1* | 12/2016 | Seo | H04N 21/4126 |
| 2016/0379074 | A1 | 12/2016 | Nielsen et al. | |
| 2017/0339526 | A9* | 11/2017 | Narasimha | H04W 4/04 |
| 2018/0091953 | A1* | 3/2018 | Nagpal | H04W 4/04 |
| 2018/0103392 | A1* | 4/2018 | Emmanuel | H04W 28/048 |

* cited by examiner

*Primary Examiner* — Kamran Afshar
*Assistant Examiner* — Farid Seyedvosoghi
(74) *Attorney, Agent, or Firm* — Henry L. Ohab

(57) ABSTRACT

A method and system of broadcasting crowd-sourced localization data from a mobile device within a pedestrian area. The method, executed in the processor of the mobile device, comprises localizing the mobile device by determining an estimated position of the mobile device within the pedestrian area based on accessing fingerprint data of the pedestrian area, broadcasting, at a first broadcast power level, a localization data packet that includes data of the estimated position to one or more peer mobile devices within the pedestrian area, determining a confidence level indicative of a degree of accuracy for the estimated position, and continuing the broadcasting at one of a lower and a higher broadcast power level than the first broadcast power level when it is determined that the confidence level is one of above and below a threshold confidence level.

20 Claims, 4 Drawing Sheets

METHOD AND SYSTEM OF CROWD-SOURCED PEDESTRIAN LOCALIZATION

TECHNICAL FIELD

The disclosure herein relates to the field of mobile device indoor navigation and localization.

BACKGROUND

Users of mobile devices are increasingly using and depending upon indoor positioning and navigation applications and features. Seamless, accurate and dependable indoor positioning of a mobile device carried or worn by a user can be difficult to achieve using satellite-based navigation systems when the latter becomes unavailable, or only sporadically available and therefore unreliable, such as within enclosed, or partially enclosed, urban infrastructure and buildings, including hospitals, shopping malls, airports, university campuses and industrial warehouses. Pedestrian navigation or positioning solutions may rely on sensors including accelerometers, gyroscopes, and magnetometers that may be commonly included in mobile phones and other mobile computing devices, in conjunction with acquired wireless communication signal data and magnetic field data to localize a pedestrian user in possession of such a mobile device.

DETAILED DESCRIPTION

Figure 1:
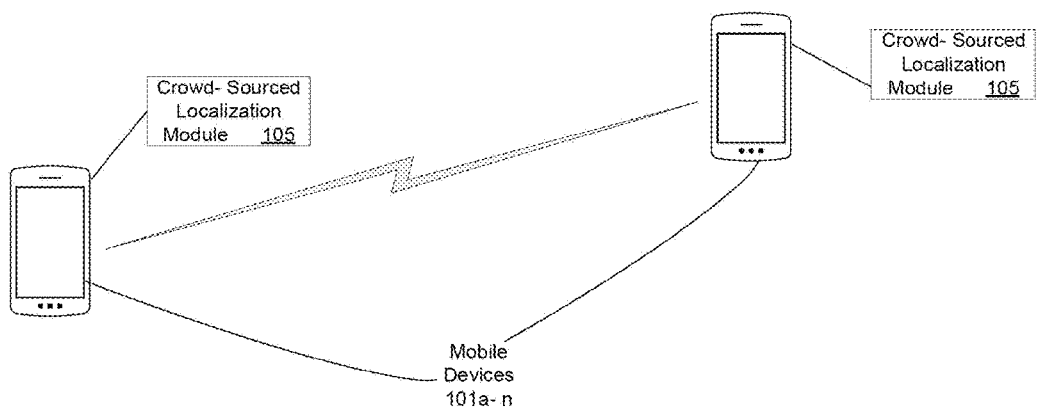
FIG. 1 illustrates, in an example embodiment, a crowd-sourced system for localization of a mobile device.

Among other benefits and technical effect, embodiments provided herein allow one or more mobile devices that can be localized with a high degree of accuracy to broadcast, via a wireless radio frequency (RF) signal, their estimated positions to peer mobile devices within a given pedestrian area. The peer mobile devices that are generally in a known proximate range, depending on transmission range inherent to a given RF signal type, such as a Bluetooth Low Energy (BLE) signal type, from the broadcasting mobile device may optionally use the broadcasted position data, as received, to establish their respective positions, or to confirm their respective positions with an increased degree of certainty. More specifically, in such a crowd sourcing-based approach, users provided with, or carrying, an indoor positioning mobile device, may broadcast their known positions to other mobile devices within the crowd of peer mobile devices. The method, executed in the processor of the mobile device, comprises localizing the mobile device by determining an estimated position of the mobile device within the pedestrian area based on accessing fingerprint data of the pedestrian area, broadcasting, at a first broadcast power level, a localization data packet to one or more peer mobile devices within the pedestrian area, determining a confidence level indicative of a degree of accuracy for the estimated position, then continuing the broadcasting at one of a lower and a higher broadcast power level than the first broadcast power level when it is determined that the confidence level is one of above and below a threshold confidence level.

In this manner, when the localization accuracy of a given broadcasting mobile device is high, then its broadcast RF power level is increased, resulting in a larger, more robust, broadcast range, especially as less accurately localized devices of the crowd of devices are relegated to broadcasting at a lower RF signal power. Advantageously, as the less accurate mobile devices of the crowd of mobile devices are quiesced in broadcasting power, those lower power RF signals propagating within the pedestrian area result in less signal interference to those mobile devices broadcasting at the higher power level, creating conditions more conducive to less noisy RF signal transmissions, which further helps to enhance localization accuracy of the latter devices. Moreover, by using more broadcast power for when positioning accuracy is relatively high and less power when positioning accuracy is lower, the reachability of positioning broadcast is enhanced whereby the position of a user with more accuracy is favored for localization of other users.

The terms localize, or localization, as used herein refer to determining a unique coordinate position of the mobile device at a specific location along a pedestrian route being traversed relative to the indoor area or building. In some embodiments, localization may also include determining a floor within the building, and thus involve determining not only horizontal planar (x, y) coordinates, but also include a vertical, or z, coordinate of the mobile device, the latter embodying a floor number within a multi-floor building, for example. In other embodiments, the (x, y, z) coordinates may be expressed either in a local reference frame specific to the mobile device, or in accordance with a global coordinate reference frame.

The pedestrian area, in embodiments, may be an indoor area within any one of a shopping mall, a warehouse, an airport facility, a hospital facility, a university campus facility or any at least partially enclosed building. The term pedestrian as used herein is intended not encompass not only walking pedestrians, but also users of mobile phones moving at typical pedestrian speeds, for example at less than 10 miles per hour using automated means within the pedestrian area, including but not limited to automated wheelchairs or automated people-moving indoor carts.

A crowd-sourced system for localizing a mobile device within a pedestrian area is also provided. The system comprises a first mobile device including a processor and a memory. The memory includes instructions executable in the processor of the first mobile device to localize the mobile device by determining an estimated position of the mobile device within the pedestrian area based on accessing fingerprint data of the pedestrian area, broadcast, at a first broadcast power level, a localization data packet within the pedestrian area, determine a confidence level indicative of a degree of accuracy for the estimated position, and continue the broadcast at one of a lower and a higher broadcast power level than the first broadcast power level when it is determined that the confidence level is one of above and below a threshold confidence level. At least a second mobile device includes a memory and a processor, the memory including instructions executable in the processor of the at least a second mobile device to, during the continuation of the broadcast, receive the localization data packet at the at least a second mobile device, and localize the at least a second mobile device using data of the localization data packet.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

A mobile device as described herein may be implemented, in whole or in part, on mobile computing devices such as cellular or smartphones, laptop computers, wearable computer devices, and tablet devices. Memory, processing, and network resources may all be used in connection with the use and performance of embodiments described herein, including with the performance of any method or with the implementation of any system.

Furthermore, one or more embodiments described herein may be implemented through the use of logic instructions that are executable by one or more processors. These instructions may be carried on a computer-readable medium. In particular, machines shown with embodiments herein include processor(s) and various forms of memory for storing data and instructions. Examples of computer-readable mediums and computer storage mediums include portable memory storage units, and flash memory (such as carried on smartphones). A mobile device as described herein utilizes processors, memory, and logic instructions stored on computer-readable medium. Embodiments described herein may be implemented in the form of computer processor-executable logic instructions or programs stored on computer memory mediums.

System Description

FIG. 1 illustrates, in an example embodiment, crowd-sourced system 100 for localization of any of mobile devices 101a-n within a pedestrian area. Mobile devices 101a-n may be such as a cellular or smartphone, a laptop or a tablet computer, or a wearable computer device that may be operational for any one or more of telephony, data communication, and data computing. As used herein, designation as mobile device 101 may refer to any one of collective mobile devices 101a-n. Mobile device 101 may include fingerprint data of a surrounding or proximate pedestrian area stored in local memory. In other variations, mobile device 101 may be connected within a computer network communication system, including the internet or other wide area network, to one or more remote server computing device(s) storing the fingerprint data of the pedestrian area, the latter being communicatively accessible to mobile device 101 for download of the fingerprint data.

A pedestrian navigation, or indoor positioning, software application downloaded and installed, or stored, in a memory of mobile device 101 may render physical layout map of a facility or building of a pedestrian area within a user interface display of mobile device 101. In one embodiment, the pedestrian navigation software application may incorporate one or more portions of processor-executable instructions manifesting crowd-sourced localization logic module 105. The terms localize, or localization, as used herein means to determine an estimated coordinate position (x, y, z) along a pedestrian route or trajectory being traversed in accompaniment of mobile device 101, ideally with an indoor positioning accuracy of up to one meter or better. The display of physical layout map may further show a trajectory or pedestrian route traversed by a user in possession of mobile device 101 within the pedestrian area.

Mobile device 101 may include sensor functionality by way of sensor devices. The sensor devices may include inertial sensors such as an accelerometer and a gyroscope, and magnetometer or other magnetic field sensing functionality, barometric or other ambient pressure sensing functionality, humidity sensor, thermometer, and ambient lighting sensors such as to detect ambient lighting intensity. Mobile device 101 may also include capability for detecting and communicatively accessing ambient wireless communication signals including but not limited to any of Bluetooth and Bluetooth Low Energy (BLE), Wi-Fi, RFID, and also satellite-based navigations signals including global positioning system (GPS) signals. Mobile device 101 further includes the capability for detecting, via sensor devices, and measuring a received signal strength, and of determining signal connectivity parameters, related to the ambient wireless signals. In particular, mobile device 101 may include location determination capability such as by way of a GPS module having a GPS receiver, and a communication interface for communicatively coupling to communication network 107, including by sending and receiving cellular data over data and voice channels.

A fingerprint data repository, or any portion(s) thereof, may be stored in a remote computing server device and made communicatively accessible to mobile device 101 via a communication network. In some embodiments, it is contemplated that the fingerprint data repository, or any portions of data and processor-executable instructions constituting the fingerprint data repository, may be downloaded for storage, at least temporarily, within a memory of mobile device 101. In embodiments, the fingerprint map data stored in the fingerprint data repository further associates particular positions along a pedestrian route of an indoor facility with any combination of fingerprint data, including gyroscope data, accelerometer data, wireless signal strength data, wireless connectivity data, magnetic data, barometric data, acoustic data, line-of sight data, and ambient lighting data stored thereon.

The terms fingerprint and fingerprint data as used herein refer to time-correlated, individual measurements of any of, or any combination of, received wireless communication signal strength and signal connectivity parameters, magnetic field parameters (strength, direction) or barometric pressure parameters, and mobile device inertial sensor data at known, particular locations along a route being traversed, and also anticipated for traversal, by the mobile device. In other words, a fingerprint as referred to herein may include a correlation of sensor and signal information (including, but not necessarily limited to wireless signal strength, wireless connectivity information, magnetic or barometric information, inertial sensor information and GPS location information) associated for a unique location relative to the facility. Thus, fingerprint data associated with a particular location or position may provide a fingerprint signature that uniquely correlates to that particular location or position. A sequence of positions or locations that constitute a navigation path traversed by the mobile device relative to a given indoor facility may be fingerprint-mapped during a calibration process, and the resulting fingerprint map stored in the fingerprint data repository. Fingerprint maps of a respective building or indoor facility, or any portions thereof, may be downloaded into a memory of mobile device 101 for use in conjunction with the pedestrian navigation software application executing thereon.

A particular fingerprint or signature based on any of received wireless communication signal strength and signal connectivity parameters, magnetic field parameters or barometric pressure parameters, and mobile device inertial sensor data may be detected or recorded by mobile device 101, whereupon the fingerprint or signature as detected may be matched to a reference fingerprint, or a reference pattern including a set of fingerprints, in a stored fingerprint map of a given facility made accessible to crowd-sourced localization logic module 105 to identify a unique position of mobile device 101 along a pedestrian route. As used herein, term signal connectivity, as distinguished from signal strength, refers to a wireless radio frequency (RF) signal being available for use in bi-directional data communication, such as between devices that both transmit and receive data using that available wireless RF signal. In some embodiments, given that sampling times and sampling rates applied in conjunction with particular mobile device sensors may be different, the signal and sensor information as measured during the fingerprint calibration process may be time-averaged across particular periods of time, with the time-averaged value being used to represent the signal information at any given instance of time within that particular period of time in which the signal information is time-averaged. Fingerprint data may be used to track traversal of mobile device 101 along a sequence of positions that constitute pedestrian route within, and even adjoining, the indoor facility.

Crowd-sourced localization logic module 105, constituted of logic instructions executable in a processor of mobile device 101 in one embodiment, may be hosted at mobile device 101 and provides, at least in part, capability for system localizing a mobile device along a pedestrian route traversed in an indoor area or facility. In alternate embodiments, one or more portions constituting crowd-sourced localization logic module 105 may be hosted remotely at a server device and made communicatively accessible to mobile device 101 via communication network 107.

Figure 2:
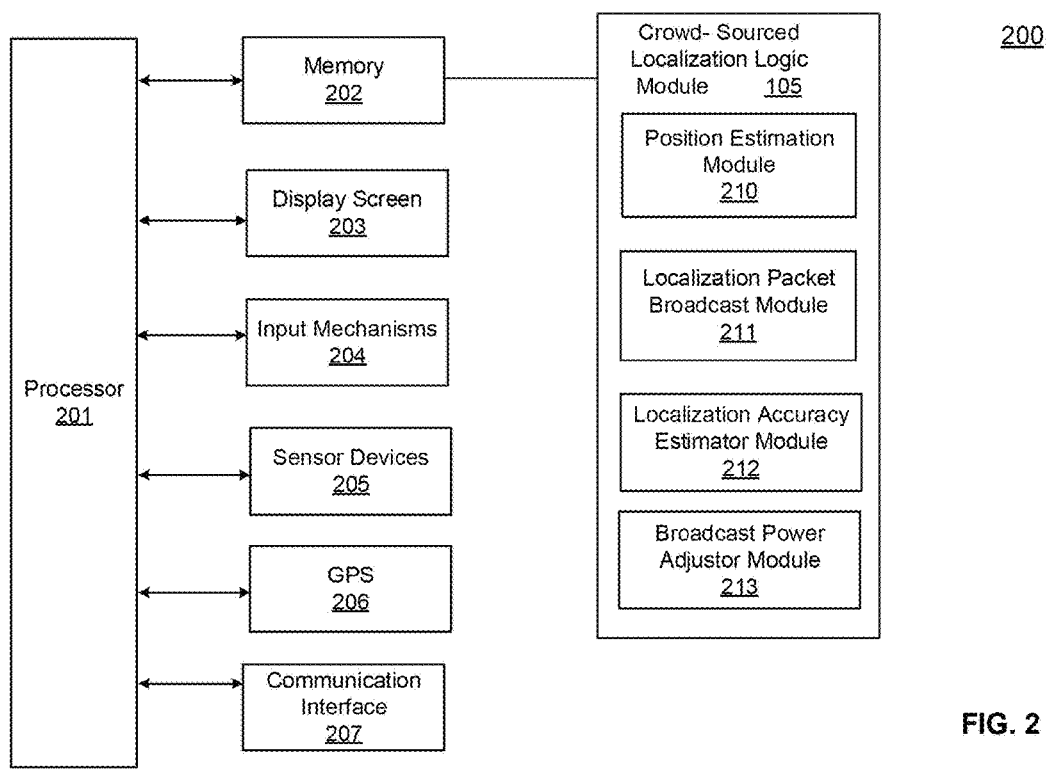
FIG. 2 illustrates, in one example embodiment, an architecture of a mobile device used in a crowd-sourced localization system.

FIG. 2 illustrates, in one example embodiment, an architecture of mobile device 101 used in crowd-sourced localization system 100. Mobile device 101 may include processor 201, memory 202, display screen 203, input mechanisms 204 such as a keyboard or software-implemented touchscreen input functionality, barcode, QR code or other symbol- or code-scanner input functionality. Memory 202 of mobile device 101 may be constituted of a random access memory, such as a dynamic or a static random access memory, in some embodiments configured or partitioned into memory portions.

Mobile device 101 may include sensor functionality by way of sensor devices 205. Sensor devices 205 may include inertial sensors such as an accelerometer and a gyroscope, and magnetometer or other magnetic field sensing functionality, barometric or other ambient pressure sensing functionality, and ambient lighting sensors, such as to detect ambient lighting intensity. Mobile devices 101a-n may also include capability for both transmitting and detecting, ambient wireless communication signals including but not limited to any of Bluetooth and Bluetooth Low Energy (BLE), Wi-Fi, RFID, and also satellite-based navigations signals such as, but not limited to, global positioning system (GPS) signals. For example, a BLE signal packet may typically include identifiers that are advertised publicly, whereby any other mobile device that can detect the BLE signals as transmitted or broadcast will be able to capture these identifiers. Mobile device 101 may, in this manner, be equipped with, and include capability for detecting, via sensor devices 205, and measuring a received signal strength, and for determining signal connectivity parameters, related to the ambient wireless radio frequency (RF) signals.

Mobile device 101 may also include location or position determination capability such as by way of GPS module 206 having a GPS receiver, and communication interface 207 for communicatively coupling to communication network 107, including by sending and receiving cellular and other RF data over data and voice channels.

Crowd-sourced localization logic module 105 of mobile device 101 includes instructions stored in memory 202 of mobile device 101, executable in processor 201. Crowd-sourced localization logic module 105 may comprise sub-modules, or portions thereof, including position estimation module 210, localization packet broadcast module 211, localization accuracy estimator module 212 and broadcast power adjustor module 213. In alternate embodiments, it is contemplated that any one or more, or portions, of sub-modules including position estimation module 210, localization packet broadcast module 211 and localization accuracy estimator module 212 may be located at remote server device communicatively accessible to mobile device 101 via network communication interface 207.

Processor 201 uses executable instructions of position estimation module 210 to localize mobile device 101 to localize mobile device 101 to an estimated first position within the pedestrian area based on accessing fingerprint data of the pedestrian area.

Processor 201 uses executable instructions stored in localization packet broadcast module 211 to broadcast, or transmit, at a first broadcast power level, a localization data packet that includes data of the estimated position to one or more peer mobile devices within the pedestrian area. The broadcasting power level may be measured in dBM (Decibel-milliwatts) and the more, or higher, the broadcast power level, the further the BLE signal is broadcast.

Processor 201 uses executable instructions stored in localization accuracy estimator module 212 to determine a confidence level indicative of a degree of accuracy for the estimated position. Since the accuracy associated with estimating the position, or location, of a mobile device 101 as a consequence of localization is not absolute, but rather is subject to the statistical, or probabilistic, nature of the fingerprint parameters, including but not limited to the inherently probabilistic nature of wireless radio frequency signal parameters as received.

Processor 201 uses executable instructions stored in broadcast power adjustor module 213 to continue broadcasting of the localization data packet at one of a lower and a higher broadcast power level when it is determined that the confidence level is one of above and below a threshold confidence level. In this manner, when the localization accuracy of mobile device 101 is high, then the broadcast power level is increased, so mobile device 101 may broadcast its localized position, encoded in the localization data packet being broadcast, to peer mobile devices 101a-n within the pedestrian area. Conversely, and beneficially, if the accuracy estimated position of mobile device 101 as localized is determined to be low, then mobile device 101 may be "quieted", or quiesced, via executable instructions stored in broadcast power adjustor module 213 by lowering its broadcasting power level. In aggregate regard to the peer mobile devices 101a-n within the pedestrian area, those one or more mobile devices having localized or estimated positions with the highest accuracy are accorded the "loudest" broadcast, at the expense of the less accurately localized mobile devices of that set of peer devices 101a-n. Advantageously, as the less accurate mobile devices 101a-n are quiesced in broadcasting power, the lower power RF signals propagating within the pedestrian area result in less signal interference to those mobile devices broadcasting at the higher power level, creating a less noisy signal transmission environment that enhances the accuracy of localization for the higher power broadcasting mobile devices. Moreover, by using more broadcast power for when positioning accuracy is relatively high and less power when positioning accuracy is lower, the reachability of positioning broadcast is enhanced whereby the position of a user with more accuracy is favored for localization of other users—for example, through triangulation or linear/nonlinear least square or other position estimation techniques.

In additional variations, at least a second mobile device in the set of peer mobile devices 101a-n within the pedestrian area receives the localization data packet broadcast by mobile device 101, and copies the localized position including floor information encoded with the localization data packet to establish its own position. In another embodiment, the second mobile device independently performs its localization to establish its position, but then uses the localization information as received from mobile device 101 to confirm its position as localized.

Methodology

Figure 3:
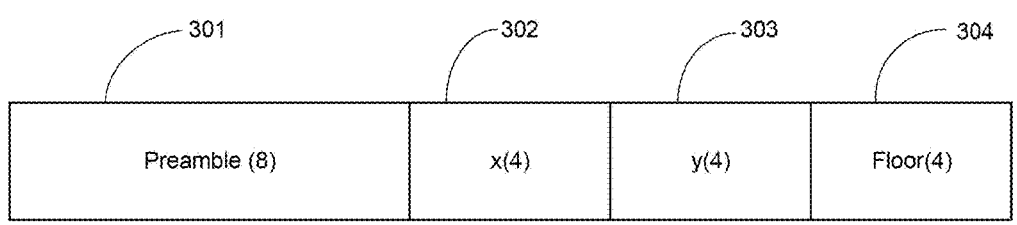
FIG. 3 illustrates an example embodiment of a localization data packet for broadcast in a crowd-sourced localization system.

FIG. 3 illustrates an example embodiment of a localization data packet 300 for broadcast in a crowd-sourced localization system 100. In describing examples of FIG. 3, reference is made to the examples of FIGS. 1-2 for purposes of illustration.

Localization data packet 300 may include location (x, y) coordinate information and floor number information 304 of mobile device 101, such as for a multi-floor building constituting the pedestrian area. The localization data packet may further be partitioned to include preamble component 300. Preamble component 300 may include a company identifier or other identifier associated with either a proprietary or a standard formatting of the localization data packet, based upon which, for example, the information encoded in localization data packet may be correctly decoded into specific (x, y, z) coordinates to establish a position of mobile device 101 as localized within the pedestrian area. In yet another variation, localization data packet may be constituted with a total of 20 bytes of information, of which preamble component 300 may be constituted of 8 bytes, and x-coordinate 302, y-coordinate 303 and floor number 304 each constituted of 4 bytes. In a further variation, the localization data packet is broadcast from mobile device 101 via a BLE advertising mode.

Figure 4:
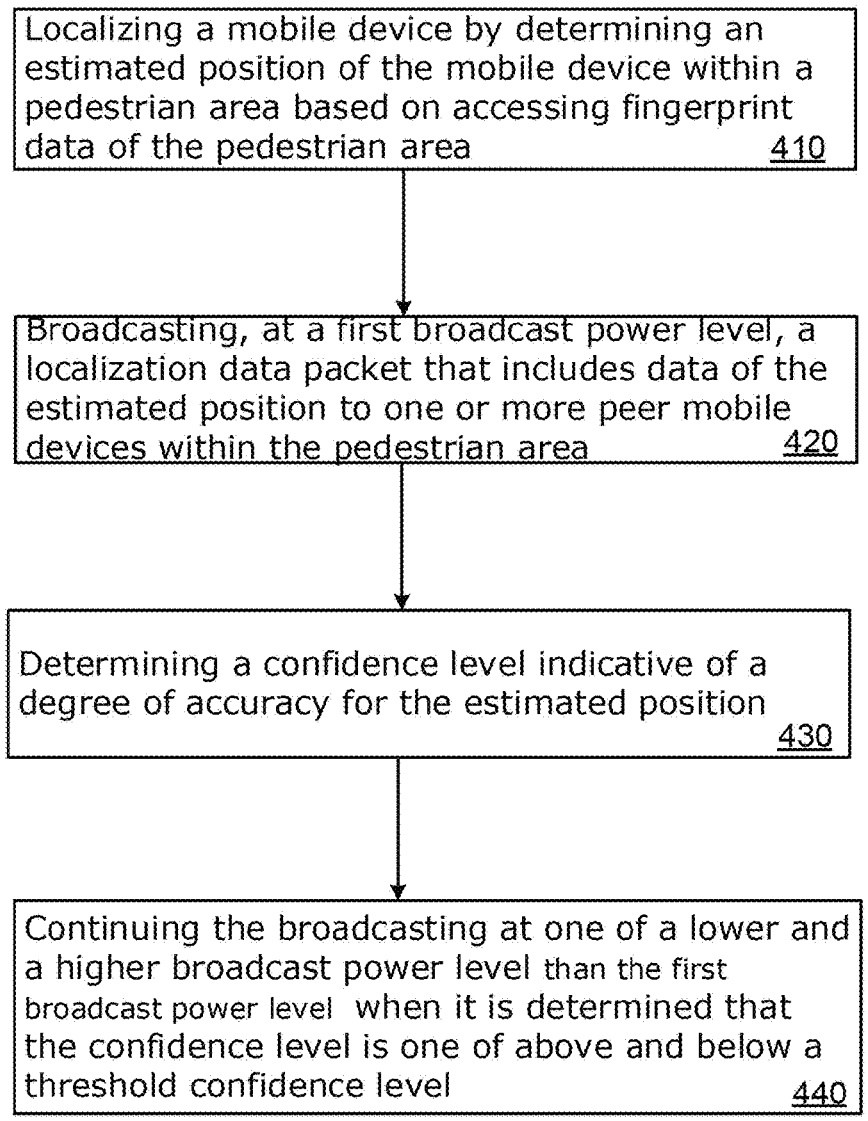
FIG. 4 illustrates an example embodiment of a method of localizing a mobile device in a crowd-sourced localization system.

FIG. 4 illustrates an example embodiment of method 400 of localizing mobile device 101 within crowd-sourced localization system 100. In describing examples of FIG. 4, reference is made to the examples of FIGS. 1-3 for purposes of illustrating suitable components or elements for performing a step or sub-step being described.

Examples of method steps described herein relate to the use of mobile device 101 for implementing the techniques described. According to one embodiment, the techniques are performed by crowd-sourced localization logic module 105 of mobile device 101 in response to the processor 201 executing one or more sequences of software logic instructions that constitute crowd-sourced localization logic module 105. In embodiments, crowd-sourced localization logic module 105 may include the one or more sequences of instructions within sub-modules including position estimation module 210, localization packet broadcast module 211 and localization accuracy estimator module 212, and broadcast power adjustor module 213. Such instructions may be read into memory 202 from machine-readable medium, such as memory storage devices, or downloaded into memory 202 via network communication interface 207. In executing the sequences of instructions of position estimation module 210, localization packet broadcast module 211, localization accuracy estimator module 212 and broadcast power adjustor module 213 of crowd-sourced localization logic module 105 in memory 202, processor 201 performs the process steps described herein. In alternative implementations, at least some hard-wired circuitry may be used in place of, or in combination with, the software logic instructions to implement examples described herein. Thus, the examples described herein are not limited to any particular combination of hardware circuitry and software instructions. Additionally, it is contemplated that in alternative embodiments, the techniques herein, or portions thereof, may be distributed between mobile device 101 and a remote but communicatively accessible server computing device.

At step 410, processor 201 executes instructions included in position estimation module 210 to localize mobile device 101 to an estimated first position within the pedestrian area based on accessing fingerprint data of the pedestrian area.

As would be appreciated by those of skill in the art, any localization, or location determination, of mobile device 101 that is based, even at least partly, on fingerprint data constituted of radio frequency (RF) signal parameters as broadcast, cannot be guaranteed with absolute certainty. For instance, considering a Bluetooth Low Energy (BLE) context for illustration purposes, such a BLE signal as broadcast in the 2.4 GHz radio frequency may be may be distorted and attenuated by interference from specific elements in the environment of the pedestrian area. Such signal interfering elements may include metallic surfaces bouncing the BLE signal off the surface in unexpected ways as it is unable to penetrate the material, BLE signal absorption, attenuation and distortion caused by human body mass absorbing, water, concrete, marble and brick structures and distorting BLE signal, other mobile devices 101a-n and other electronic devices operating in the 2.4 GHz frequency, fluorescent lighting emitting signals in the 2.4 GHz frequency, and electric power lines, for example. When the BLE signal is distorted, the mobile device will receive a signal that does not reflect the real situation, e.g. the distance to a fingerprint data point or position might not be accurate, since the accuracy levels are affected by various sources of signal distortion and might not reflect the actual (x, y) coordinate determined by localization.

At step 420, processor 201 executes instructions included in localization packet broadcast module 211 to broadcast, or transmit, at a first broadcast power level, a localization data packet that includes data of the estimated position to one or more peer mobile devices within the pedestrian area. The broadcasting power level may be measured in dBM (Decibel-milliwatts) and the more, or higher, the broadcast power level, the further the BLE signal is broadcast.

In one embodiment, localization data packet 300 includes location (x, y) coordinate information and floor number information 304 of mobile device 101, such as for a multi-floor building constituting the pedestrian area. The localization data packet may further be partitioned to include preamble component 300. Preamble component 300 may include a company identifier or other identifier associated with either a proprietary or a standard formatting of the localization data packet, based upon which, for example, the information encoded in localization data packet may be correctly decoded into specific (x, y, z) coordinates to establish a position of mobile device 101 as localized within the pedestrian area.

At step 430, processor 201 executes instructions included in localization accuracy estimator module 212 to, determining a confidence level indicative of a degree of accuracy for the estimated position. Since the accuracy associated with estimating the position, or location, of a mobile device 101 as a consequence of localization is not absolute, but rather is subject to the statistical, or probabilistic, nature of the fingerprint parameters, including but not limited to the inherently probabilistic nature of wireless radio frequency signal parameters as received. In some embodiments, a degree of accuracy associated with the position estimation may be indicated by a confidence level that is determined for, and assigned in conjunction with, estimated first and second positions 301, 311 as localized. As a measure of the accuracy of localization of mobile device 101, the confidence level associated with the location estimate may be obtained by fusing the probabilistic results of multiple concurrent location estimates. In some embodiments, the variance in the x and y components, with respect to their mean values ($\mu_x$, $\mu_y$), can be estimated independently as:

$$\sigma_x^2 = 1/N-1 \Sigma (x-\mu_x)^2$$

$$\sigma_y^2 = 1/N-1 \Sigma (y-\mu_y)^2$$

and combined to produce the confidence level. In one embodiment, the overall confidence level can be selected as a function of the maximum standard deviation of the x-y components, as $\sigma = \max(\sigma_x, \sigma_y)$. In other embodiments, a weighted variance of the x and y, where the weights are based on the probability of each individual estimate can be used to produce the confidence estimate. When multiple trajectory-based location estimates are available, trajectories can be grouped into categories based on similarity and a probability spread/confidence can be assigned on a per-group basis. If the per-group probability/confidence level of one group significantly exceeds that of the other groups, then the confidence in the validity of that group is raised, and hence, the confidence in the location estimate increases. Conversely, if several distinct per-group probabilities are similar, then the confidence in the per-group results are reduced, leading to a lower confidence level. Thus the estimated position comprises a probabilistic estimate expressed as a confidence level. In one embodiment, the threshold confidence level may be established using a range of from 60 to 90 percent.

Generally, in context of one or more mobile devices 101a-n collectively broadcasting and receiving broadcast BLE signals, as the variability in the BLE signals existing in the pedestrian area decreases, referred to herein as a tighter or narrower normal distribution of signal parameters, such as due to lowered levels of signal interference that result from lower broadcast power levels, the confidence level associated with the accuracy of estimated position of mobile device 101 increases.

At step 440, processor 201 executes instructions included in broadcast power adjustor module 213 to continue broadcasting, by mobile device 101, at one of a lower and a higher broadcast power level if the confidence level is one of above and below a threshold confidence level.

In some embodiments, the lower and higher broadcast power levels may range from −100 to +20 Decibel-milliwatts (dBm), representing the BLE signal strength as measured by mobile devices 101a-n.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no specific mention of the particular combination of features. Thus, the absence of describing combinations should not preclude the inventors from claiming rights to such combinations.

What is claimed is:

1. A method of broadcasting crowd-sourced localization data from a mobile device within a pedestrian area, the mobile device including a processor and a memory, the method executed in the processor and comprising:

localizing the mobile device by determining an estimated position of the mobile device within the pedestrian area based on accessing fingerprint data of the pedestrian area;

broadcasting, at a first broadcast power level, a localization data packet that includes data of the estimated position to one or more peer mobile devices within the pedestrian area;

determining a confidence level indicative of a degree of accuracy for the estimated position, by fusing probabilistic results of one or more concurrent location estimates; and continuing the broadcasting at one of: a lower broadcast power level than the first broadcast power level, when it is determined that the confidence level is below a threshold confidence level and a higher broadcast power level than the first broadcast power level when it is determined that the confidence level is of above the threshold confidence level.

2. The method of claim 1 wherein the pedestrian area comprises an indoor area within at least one of a shopping mall, a warehouse, an airport facility, a hospital facility, a university campus facility and an at least partially enclosed building.

3. The method of claim 1 further comprising broadcasting the localization data packet as a Bluetooth Low Energy (BLE) transmission.

4. The method of claim 1 wherein the localization data packet comprises location coordinate information and floor number information within the pedestrian area.

5. The method of claim 4 wherein the localization data packet further comprises a preamble component, the preamble component including a company identifier associated with formatting of the localization data packet.

6. The method of claim 1 wherein the localizing is based on at least one of an orientation, a magnetic field strength and direction, a received wireless communication signal strength, a wireless connectivity indication and a barometric pressure in accordance with the fingerprint data.

7. The method of claim 6 wherein the fingerprint data includes respective time-stamps whereby the orientation, the magnetic field strength and direction, the received wireless signal strength, the wireless connectivity indication and the barometric pressure are correlated in accordance with the respective time-stamps.

8. The method of claim 1 wherein the lower and higher broadcast power levels range from −100 to +20 Decibel-milliwatts (dBm).

9. The method of claim 1 wherein the estimated position comprises a probabilistic estimate expressed as a confidence level.

10. The method of claim 9 wherein the threshold confidence level ranges from 60 to 90 percent.

11. A crowd-sourced system for localizing a mobile device within a pedestrian area, the system comprising:
   a first mobile device including a processor and a memory, the memory including instructions executable in the processor of the first mobile device to:
      localize the mobile device by determining an estimated position of the mobile device within the pedestrian area based on accessing fingerprint data of the pedestrian area;
      broadcast, at a first broadcast power level, a localization data packet that includes data of the estimated position within the pedestrian area;
      determine a confidence level indicative of a degree of accuracy for the estimated position, by fusing probabilistic results of one or more concurrent location estimates; and
      continue the broadcast at one of: a lower broadcast power level than the first broadcast power level, when it is determined that the confidence level is below a threshold confidence level, and a higher broadcast power level than the first broadcast power level when it is determined that the confidence level is above the threshold confidence level;
   and
      at least a second mobile device including a memory and a processor, the memory including instructions executable in the processor of the at least a second mobile device to:
         during the continuation of the broadcast, receive the localization data packet at the at least a second mobile device; and
         localize the at least a second mobile device using the data pertaining to estimated position in the localization data packet corresponding to the first mobile device.

12. The crowd-sourced system of claim 11 wherein the pedestrian area comprises an indoor area within at least one of a shopping mall, a warehouse, an airport facility, a hospital facility, a university campus facility and an at least partially enclosed building.

13. The crowd-sourced system of claim 11 further comprising instructions executable in the processor of the first mobile device to broadcast the localization data packet as a Bluetooth Low Energy (BLE) transmission.

14. The crowd-sourced system of claim 11 wherein the localization data packet comprises location coordinate information and floor number information within the pedestrian area.

15. The crowd-sourced system of claim 14 wherein the localization data packet further comprises a preamble component, the preamble component including a company identifier associated with formatting of the localization data packet.

16. The crowd-sourced system of claim 11 wherein the localizing is based on at least one of an orientation, a magnetic field strength and direction, a received wireless communication signal strength, a wireless connectivity indication and a barometric pressure in conjunction with the fingerprint data.

17. The crowd-sourced system of claim 16 wherein the fingerprint data includes respective time-stamps whereby the orientation, the magnetic field strength and direction, the received wireless signal strength, the wireless connectivity indication and the barometric pressure are correlated in accordance with the respective time-stamps.

18. The crowd-sourced system of claim 11 wherein the lower and higher broadcast power levels range from −100 to +20 Decibel-milliwatts (dBm).

19. The crowd-sourced system of claim 11 wherein the estimated position comprises a probabilistic estimate expressed as a confidence level.

20. The crowd-sourced system of claim 19 wherein the threshold confidence level ranges from 60 to 90 percent.

* * * * *